United States Patent

Murphy et al.

[11] Patent Number: 5,692,703
[45] Date of Patent: Dec. 2, 1997

[54] MULTIPLE APPLICATION WHEEL WELL DESIGN

[75] Inventors: David G. Murphy, Los Alamitos; Neil M. Jerstad, Long Beach, both of Calif.; Edward A. Wen, Taipei, Taiwan

[73] Assignee: McDonnell Douglas Corporation, Huntington Beach, Calif.

[21] Appl. No.: 644,353

[22] Filed: May 10, 1996

[51] Int. Cl.$^6$ ................................................. B64C 25/10
[52] U.S. Cl. ............................ 244/102 R; 244/103 R; 244/119
[58] Field of Search ............................ 244/100 R, 102 R, 244/102 A, 103 R, 129.1, 129.4, 129.5, 119

[56] References Cited

U.S. PATENT DOCUMENTS

| | | | |
|---|---|---|---|
| 2,559,451 | 7/1951 | McBearty | 244/103 |
| 2,630,990 | 3/1953 | Kanode et al. | 244/102 |
| 2,921,759 | 1/1960 | Elkin et al. | 244/102 |
| 3,511,456 | 5/1970 | Fehring et al. | 244/102 |
| 3,687,400 | 8/1972 | Fitzgerald et al. | 244/102 R |
| 4,155,522 | 5/1979 | Sealey | 244/102 R |
| 4,638,962 | 1/1987 | Gunter et al. | 244/102 R X |
| 4,995,574 | 2/1991 | Bernard et al. | 244/102 R X |
| 5,000,400 | 3/1991 | Stuhr | 244/102 R |
| 5,100,083 | 3/1992 | Large et al. | 244/102 R X |

Primary Examiner—William Grant
Attorney, Agent, or Firm—Bell, Seltzer, Park & Gibson, P.A.

[57] ABSTRACT

An aircraft landing gear wheel stowage structure including a wing rear spar extending laterally across the aircraft; a mid bulkhead extending laterally across the aircraft and displaced rearwardly of the wing rear spar; a pressure bulkhead extending laterally across the aircraft and displaced rearwardly of the mid bulkhead; first and second longitudinal keel structures laterally spaced on each side of a longitudinal axis of the aircraft and traversing the wing rear spar, the mid bulkhead and the pressure bulkhead. The wing rear spar, the mid bulkhead, the first keel structure, and the second keel structure form a first forward outboard wheel well compartment that is outboard of the first keel structure, a second forward outboard wheel well compartment that is outboard of the second keel structure, and a forward central wheel well compartment that is between the first keel structure and the second keel structure. The mid bulkhead, the pressure bulkhead, the first keel structure, and the second keel structure form a first aft outboard wheel well compartment that is outboard of the first keel structure and behind the first forward outboard wheel well compartment, and a second aft outboard wheel well compartment that is outboard of the second keel structure and behind the second forward outboard wheel well compartment. A horizontal pressure panel forms the ceilings of the wheel well compartments.

4 Claims, 3 Drawing Sheets

MULTIPLE APPLICATION WHEEL WELL DESIGN

BACKGROUND OF THE INVENTION

The design and manufacture of large transport aircraft is extremely expensive. It is therefore economically advantageous to design a family of aircraft that is based on a basic airframe, whereby different configurations are achieved by the use of different propulsion systems (e.g., the number and location of engines), and fuselage stretching. A significant consideration of utilizing a basic airframe for different considerations is weight which affects the landing gear. As aircraft weight increases, the number of wheels required increases. The increased number of landing gear wheels can be achieved by increasing the number of wheels supported by each post of the landing gear, or by increasing the number of posts in the landing gear. Different gear configurations have different gear stowage requirements. Typically, known airframe designs do not allow for use of different numbers of landing gear posts.

Providing landing gear stowage requires a portion of the lower fuselage aft of the wing to be unpressurized, which also displaces efficient longitudinal load carrying structure. Therefore, the landing gear stowage area must contain fuselage pressure along its boundaries and incorporate longitudinal load carrying structure.

SUMMARY OF THE INVENTION

It would therefore be an advantage to provide an aircraft wheel well structure that allows for stowage of landing gear designs with different numbers of landing gear posts.

The foregoing and other advantages are provided by the invention in an aircraft landing gear wheel stowage structure that includes a wing rear spar extending laterally across the aircraft; a mid bulkhead extending laterally across the aircraft and displaced rearwardly of the wing rear spar; a pressure bulkhead extending laterally across the aircraft and displaced rearwardly of the mid bulkhead; and first and second longitudinal keel structures laterally spaced on each side of a longitudinal axis of the aircraft and traversing the wing rear spar, the intermediate bulkhead and the pressure bulkhead. The wing rear spar, the mid bulkhead, the first keel structure, and the second keel structure form a first forward outboard wheel well compartment that is outboard of the first keel structure, a second forward outboard wheel well compartment that is outboard of the second keel structure, and a forward central wheel well compartment that is between the first keel structure and the second keel structure. The mid bulkhead, the pressure bulkhead, the first keel structure, and the second keel structure form a first aft outboard wheel well compartment that is outboard of the first keel structure and behind the first forward outboard wheel well compartment, and a second aft outboard wheel well compartment that is outboard of the second keel structure and behind the second forward outboard wheel well compartment.

BRIEF DESCRIPTION OF THE DRAWINGS

The advantages and features of the disclosed invention will readily be appreciated by persons skilled in the art from the following detailed description when read in conjunction with the drawings wherein.

DETAILED DESCRIPTION OF THE DISCLOSURE

Figure 1:
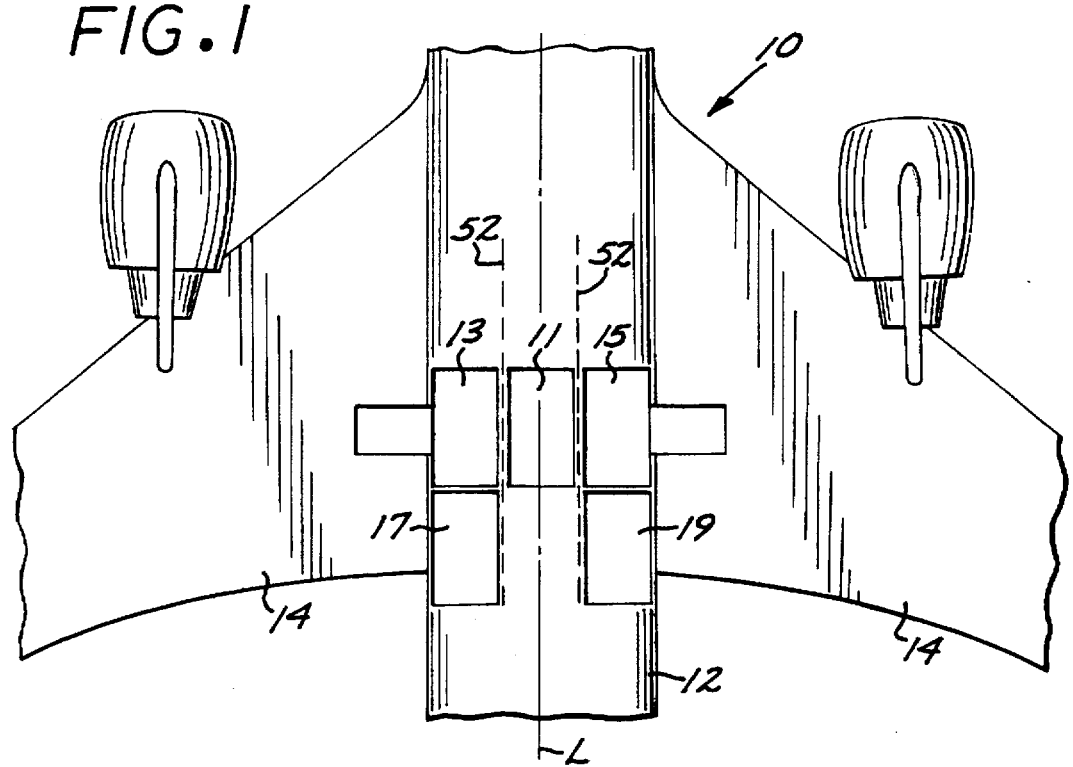
FIG. 1 is a partial bottom plan view of an aircraft in which a wheel well structure in accordance with the invention is implemented.

In the following detailed description and in the several figures of the drawing, like elements are identified with like reference numerals.

The following disclosure is generally directed to a wheel well structure for stowage of the main landing gear of a large transport aircraft. The main landing gear of an aircraft is commonly comprised of a plurality of units or trucks of wheels, each truck having a plurality of wheels, and each truck being mounted on one end of a respective post or strut having its other end integrally attached to trunions that are pivotally attached to a structural member of the aircraft. A post and its associated trunions are rotated to extend and retract the associated wheel truck. For ease of reference, a main landing gear of an aircraft will be characterized by the number of main landing gear posts or struts contained in the landing gear. For example, a main landing gear having two posts each with a truck having a number of wheels mounted thereon will be referred to as a two post main landing gear. Similarly, a main landing gear having four posts each with a truck having a number of wheels mounted thereon will be referred to as a four post main landing gear.

Referring now to FIG. 1, set forth therein is a schematic bottom plan view of an aircraft 10 having wings 14 and a fuselage 12 that implements a wheel well structure in accordance with the invention. The wheel well structure comprises a forward center wheel well compartment 11 that is between first and second longitudinally extending fuselage keel structures 52, a forward outboard wheel well compartment 13 on one side of the forward center wheel well compartment 11 and outboard of an adjacent keel structure 52, and a forward outboard wheel well compartment 15 on the other side of the forward center wheel well compartment 11 and outboard of an adjacent keel structure 52. The wheel well structure further includes an aft outboard wheel well compartment 17 that is outboard of one keel structure 52, and an aft outboard wheel well compartment 19 that is outboard of the other keel structure 52.

The fuselage keel structures 52 are laterally spaced to opposite sides of a longitudinal axis L of the aircraft 10 by equal lateral distances, and extend along the longitudinal axis L forward and aft of the wheel well compartments. As more particularly illustrated in FIG. 3, each fuselage keel structure 52 is comprised of a keel beam 51 and a keel web 55 which extend vertically upward from the keel beam 51. The keel beams 51 extend from forward of a wing rear spar 57 to the pressure bulkhead 61, while the keel webs 55 extend rearwardly from the rear wing spar 57 to the pressure bulkhead 61.

Figure 2:
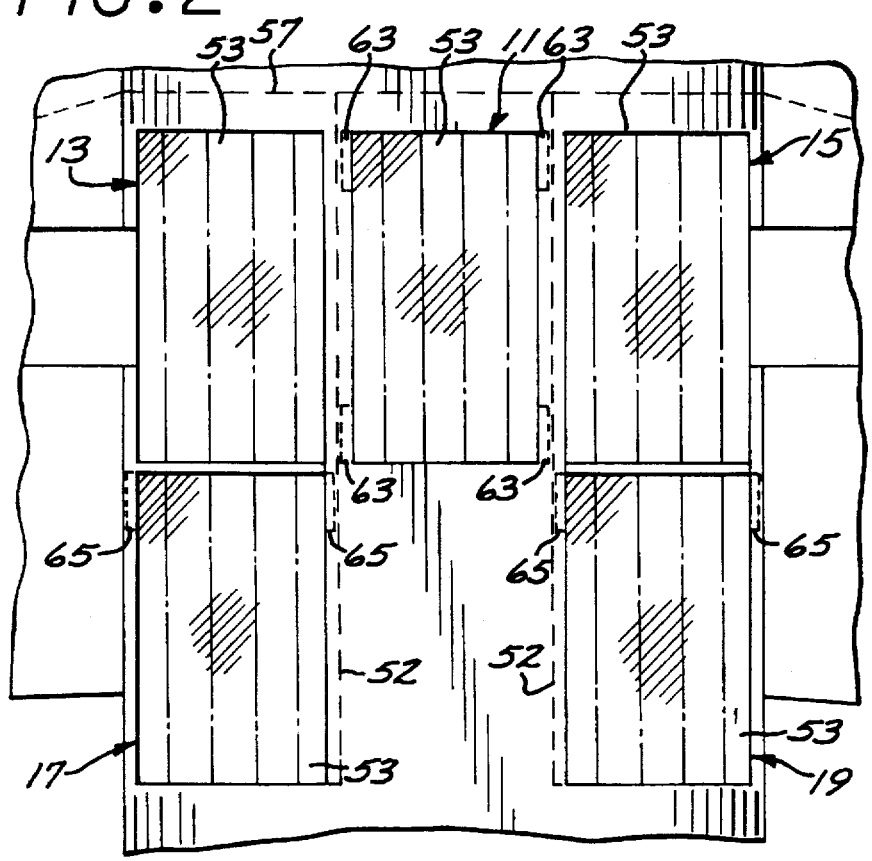
FIG. 2 is a schematic bottom plan view of the wheel well structure of the invention.
Figure 3:
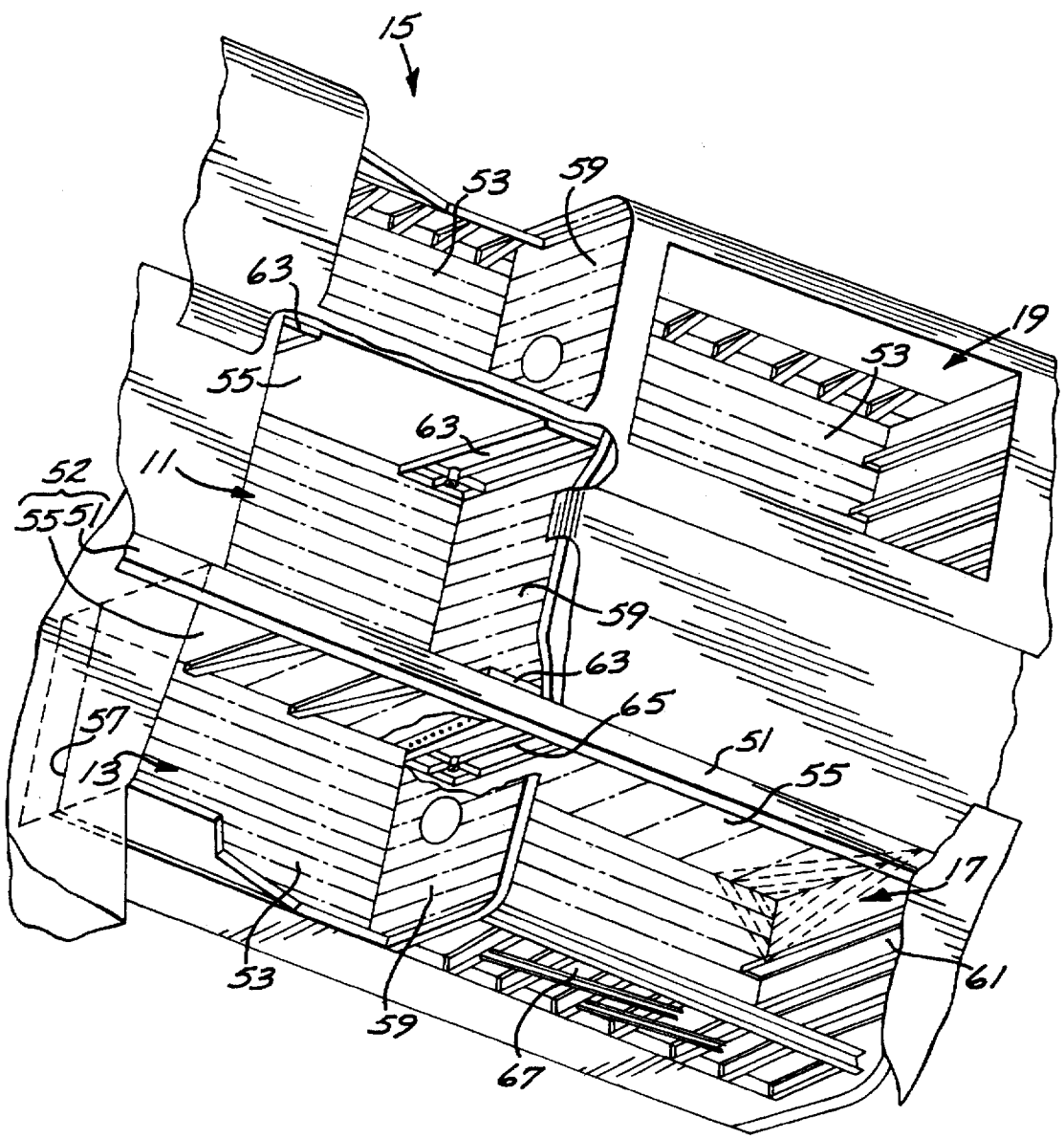
FIG. 3 is a schematic perspective view of the wheel well structure of the invention looking upward.

Referring now to FIGS. 2 and 3, the ceilings of the wheel well compartments are formed by a horizontal pressure panel 53 of the aircraft 10. The side walls of the forward center wheel well compartment are formed by the keel structures 52 formed by the keel webs 55 and the keel beams 51. In addition to serving as wheel well compartment dividers, the keel structures 52 transfer longitudinal fuselage loads, and also support landing gear doors (not shown). The inboard walls of the forward outboard wheel well compartments 13, 15 and the aft outboard wheel well compartments 17, 19 are respectively formed by the keel structures 52. The forward walls of the forward wheel well compartments 11, 13, 15 are formed by a wing rear spar 57. The aft walls of the forward wheel well compartments 11, 13, 15 and the forward walls of the aft wheel well compartments 17, 19 are formed by a laterally extending mid bulkhead 59. The aft walls of the aft wheel well compartments 17, 19 are formed by a laterally extending pressure bulkhead 61. The outboard walls of the aft wheel well compartments 17, 19 are formed by flap track support panels 67.

Trunion fittings 63 located at forward or aft positions within the forward center wheel well, depending on the landing gear post configuration, are attached to the keel structures 52 and the horizontal pressure panel 53. Further trunion fittings 65 located at forward inboard positions within the aft outboard wheel well compartments 17, 19 are attached to the keel structures 52 and the horizontal pressure panel 53; and further trunion fittings 65 located at forward outboard positions within the aft outboard wheel well compartments 17, 19 are attached to the flap track support panels 67 and the horizontal pressure panel 53. It should be appreciated that trunion fittings for the outboard landing gear would be conventionally attached to the wing rear spar outboard of the fuselage.

As to the area between the aft outboard wheel well compartments 17, 19, such area could be utilized as cargo storage that is accessible from the outside (i.e., from beneath the aircraft), or for the location of aircraft systems.

Figure 4:
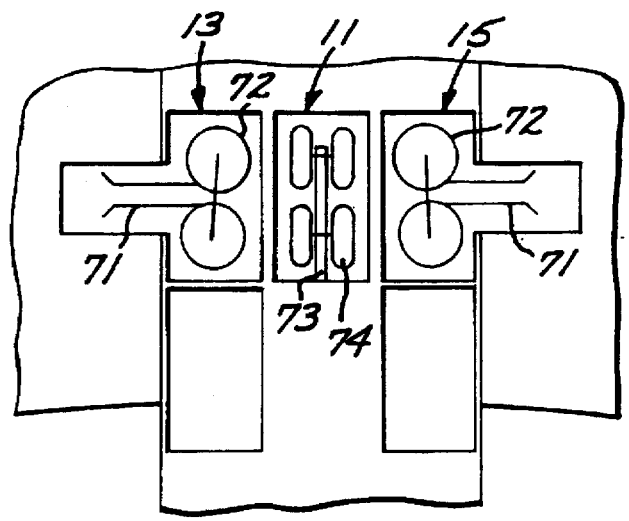
FIG. 4 is a schematic bottom plan view illustrating a three-post implementation of the wheel well structure of the invention.

Referring now to FIG. 4, schematically illustrated therein is a three-post implementation of the wheel well structure of the invention. Outboard posts 71 that support outboard wheel trucks 72 are integrally attached to trunions (not shown) that are pivotally supported on the aircraft wings such that the outboard wheel trucks 72 are stowed in the forward outboard wheel well compartments 13, 15 when the outboard posts 71 are pivoted for retraction of the landing gear. A center post 73 that supports a center wheel truck 74 is integrally attached to trunions (not shown) that are pivotally supported by the trunion fittings 63 (FIG. 3) located in the aft portion of the forward center wheel well compartment 11 such that the center wheel truck 74 is stowed in the forward center wheel well compartment 11 when the center post 73 is pivoted for retraction of the landing gear.

Figure 5:
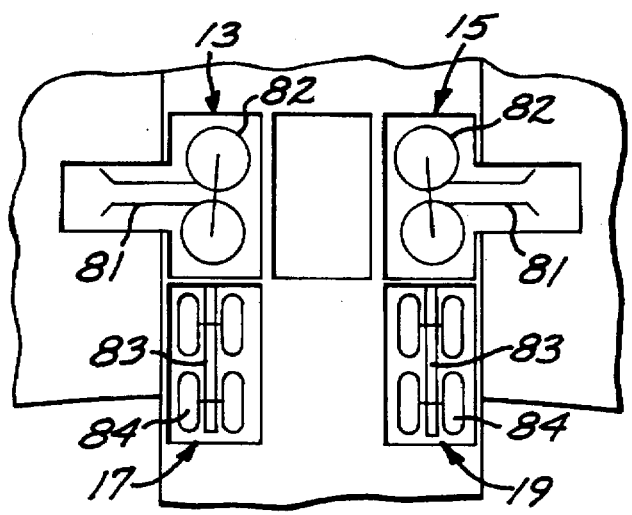
FIG. 5 is a schematic bottom plan view illustrating a four-post implementation of the wheel well structure of the invention.

Referring now to FIG. 5, schematically illustrated therein is a four-post implementation of the wheel well structure of the invention. Forward outboard posts 81 that support forward outboard wheel trucks 82 are integrally attached to trunions (not shown) that are pivotally supported on the aircraft wings such that the outboard wheel trucks 82 are stowed in the forward outboard wheel well compartments 13, 15 when the forward outboard posts 81 are pivoted for retraction of the landing gear. Aft outboard posts 83 that support aft outboard wheel trucks 84 are integrally attached to trunions (not shown) that are pivotally supported by the trunion fittings 65 (FIG. 3) located in the forward portions of the aft outboard wheel well compartments 17, 19 such that the aft outboard wheel trucks 84 are stowed in the aft outboard wheel well compartments 17, 19 when the aft outboard posts 83 are pivoted for retraction of the landing gear.

Figure 6:
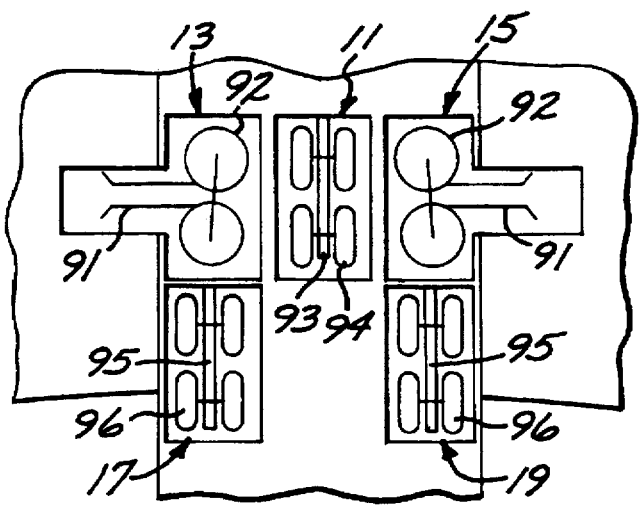
FIG. 6 is a schematic bottom plan view illustrating a five-post implementation of the wheel well structure of the invention.

Referring now to FIG. 6, schematically illustrated therein is a five-post implementation of the wheel well structure of the invention. Forward outboard posts 91 that support forward outboard wheel trucks 92 are integrally attached to trunions (not shown) that are pivotally supported on the aircraft wings such that the outboard wheel trucks 92 are stowed in the forward outboard wheel well compartments 13, 15 when the forward outboard posts 91 are pivoted for retraction of the landing gear. A center post 93 that supports a center wheel truck 94 is integrally attached to trunions (not shown) that are pivotally supported by the trunion fittings 63 (FIG. 3) located in the forward portion of the forward center wheel well compartment 11 such that the center wheel truck 94 is stowed in the forward center wheel well compartment 11 when the center post 93 is pivoted for retraction of the landing gear. Aft outboard posts 95 that support aft outboard wheel trucks 96 are mounted on trunions (not shown) that are pivotally supported by the trunion fittings 65 (FIG. 3) located in the forward portions of the aft outboard wheel well compartments 17, 19 such that the aft outboard wheel trucks 96 are stowed in the aft outboard wheel well compartments 17, 19 when the aft outboard posts 95 are pivoted for retraction of the landing gear.

The foregoing has been a disclosure of a wheel well compartment structure that advantageously allows for stowage of landing gear designs with different numbers of landing gear posts, which makes maximum use of the unpressurized area in the forward portion of the wheel well area.

Although the foregoing has been a description and illustration of specific embodiments of the invention, various modifications and changes thereto can be made by persons skilled in the art without departing from the scope and spirit of the invention as defined by the following claims.

What is claimed is:

1. A landing gear wheel stowage structure for an aircraft, comprising:

a wing rear spar extending laterally across the aircraft;

a mid bulkhead extending laterally across the aircraft and displaced rearwardly of said wing rear spar;

a pressure bulkhead extending laterally across the aircraft and displaced rearwardly of said mid bulkhead;

a first longitudinal keel structure laterally spaced to one side of a longitudinal axis of the aircraft and extending along side the longitudinal axis, and traversing said wing rear spar, said mid bulkhead and said pressure bulkhead;

a second longitudinal keel structure laterally spaced to another side of the longitudinal axis of the aircraft and extending along side the longitudinal axis, and traversing said wing rear spar, said mid bulkhead and said pressure bulkhead;

wherein said wing rear spar, said mid bulkhead, said first keel structure, and said second keel structure form a first forward outboard wheel well compartment that is outboard of said first keel structure, a second forward outboard wheel well compartment that is outboard of said second keel structure, and a forward central wheel well compartment that is between said first keel structure and said second keel structure; and wherein said mid bulkhead, said pressure bulkhead, said first keel structure, and said second keel structure form a first aft outboard wheel well compartment that is outboard of said first keel structure and behind said first forward outboard wheel well compartment, and a second aft out board wheel well compartment that is outboard of said second keel structure and behind said second forward outboard wheel well compartment.

2. The aircraft wheel stowage structure of claim 1 further including trunion fittings located in said forward central wheel well compartment.

3. The aircraft wheel stowage structure of claim 1 further including trunion fittings located in said first aft outboard wheel well compartment and said second aft outboard wheel well compartment.

4. The aircraft wheel stowage structure of claim 1 wherein said first keel structure includes a first keel beam that extends to said pressure bulkhead, and said second keel structure includes a second keel beam that extends to said pressure bulkhead.

* * * * *